Feb. 3, 1970 C. S. MILLER 3,493,866

FREQUENCY STEPPED PHASE SHIFT KEYED COMMUNICATION SYSTEM

Filed June 13, 1968 2 Sheets-Sheet 1

INVENTOR.
CHAUNCEY S. MILLER
BY Robert J. Haase
ATTORNEY

INVENTOR.
CHAUNCEY S. MILLER
BY
Robert J. Haase
ATTORNEY

United States Patent Office 3,493,866

Patented Feb. 3, 1970

3,493,866
FREQUENCY STEPPED PHASE SHIFT KEYED COMMUNICATION SYSTEM

Chauncey S. Miller, Concord, Mass., assignor to Sperry Rand Corporation, a corporation of Delaware Filed June 13, 1968, Ser. No. 736,859
Int. Cl. H04b 7/12
U.S. Cl. 325—30 6 Claims

ABSTRACT OF THE DISCLOSURE

The transmitter of the present communication system generates a carrier signal which is phase modulated to provide a conventional phase shift keyed signal. A frequency step generator produces a succession of different frequency coherently related pulses. Each pulse is mixed with a respective portion of the phase shift keyed signal and the resulting upper sideband is filtered out and transmitted. The receiver of the present communication system also produces the same succession of pulses and synchronizes the same to the received signals. The synchronized pulses and signals are mixed and the resulting lower sideband is filtered out to yield the original conventional phase shift keyed signal which then is detected. Provision is made for Doppler compensation of the received signals.

Background of the invention

The present invention generally relates to communication systems and, more particularly, to those systems wherein interference is encountered having the same form as the desired signal. Such interference can be caused by multiple propagation paths between the transmitter and receiver. Multipath interference is common, for example, in underwater telemetry communication between two deeply submerged vessels or between a deeply submerged vessel and a surface vessel. Prior art attempts at reducing self-interference disturbances in communication systems include the use of a sufficient interval between successive transmissions to permit the signal received over the longest transmission path to become substantially attenuated before the next signal is received from the shortest transmission path. Clearly, the resort to a "guard" interval between successive transmissions in order to avoid self-interference limits the maximum data rate of the communication system.

Summary of the invention

In accordance with the present invention, the successive pulses comprising a phase shift keyed signal are transmitted at different frequencies, the entire sequence of frequency steps repeating over an interval which exceeds the maximum multi-path delay anticipated in the communication system. The receiver locally generates the same frequency stepped signal sequence as does the transmitter and synchronizes the locally generated signal to the received signal. By mixing the received signals with the synchronized locally generated signal and then filtering out the proper sideband of the resulting signal, the original phase shift keyed signal is recovered. The recovered signal may be detected in a conventional manner. By making the period of the frequency stepping sequence greater than the anticipated multi-path delay and by properly synchronizing the receiver with the incoming signals, self-interference due to multi-path effects is substantially eliminated.

Minor synchronization errors in the receiver cause only a tolerable deterioration in performance without introducing error in the received data. Each of the frequency stepped transmitted signals can be made orthogonal to the others by suitable choice of parameters whereby the carrier frequency, the duration of each transmitted signal and the frequency separation between the successive signals are integrally related to each other, i.e., $$f_o = m\frac{1}{T}$$

and $$f_s = n\frac{1}{T}$$

T being the duration of each transmitted signal, $f_o$ being the frequency separation between successive signals, $f_s$ being the carrier frequency, and $m$ and $n$ being integers.

Description of the preferred embodiments

Figure 1:
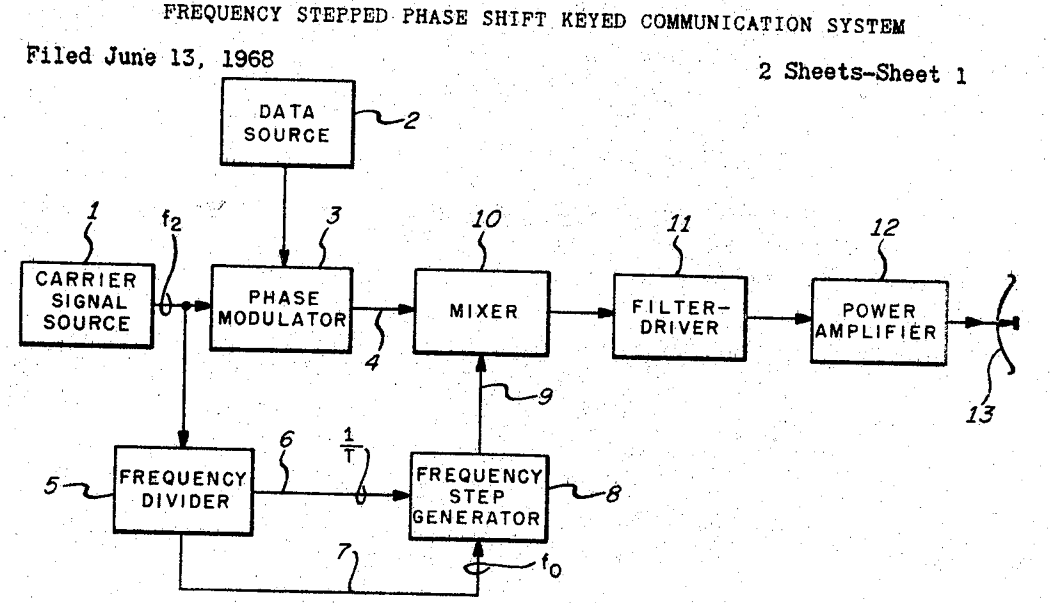
FIGURE 1 is a block diagram of the transmitter portion of the present communication system.

In accordance with the present invention, self-interference in a data communication system is combated while still reasonably conserving available bandwidth by the use of phase shift keyed transmitted signals which are simultaneously stepped between coherently related frequencies. The frequency stepping procedure does not inject any random phase into the signals which might cause errors in the communicated data. The transmitter portion of the present invention shown in FIGURE 1 comprises a carrier signal source 1 and a data source 2 which are coupled to phase modulator 3 to provide a conventional phase shift keyed signal on line 4. The unmodulated signal from source 1 also is applied to frequency divider 5 which provides two different frequency outputs on lines 6 and 7 for application to frequency step generator 8. As will be described with reference to FIGURE 3, generator 8 provides on line 9 a local oscillator signal $l(t)$ which may be described as follows:

$$l(t)=\begin{cases} A_1 \cos a_1\omega_o t & \text{for } 0 \leq t < T_1 \\ A_1 \cos a_2\omega_o t & T_1 \leq t < T_2 \\ \vdots & \vdots \\ A_1 \cos a_n\omega_o t & T_{n-1} \leq t < T_n \end{cases}$$

where $a_1 \ldots a_n$ are integers,

It should be noted that there is no random phase shift associated with the above-described local oscillator signals. Such coherence is achieved by making the frequencies $a_1\ \omega_0$ harmonically related and derived from the same source.

The conventional phase shift keyed signal $s(t)$ on line 4 can be described as follows:

$$s(t)=\begin{cases} A_s \cos (\omega_s t+\phi_1) & \text{for } 0 \leq t < T_1 \\ A_s \cos (\omega_s t+\phi_2) & T_1 \leq t < T_2 \\ \vdots & \vdots \\ A_s \cos (\omega_s t+\phi_n) & T_{n-1} \leq t < T_n \end{cases}$$

where $\omega_s$ is the carrier frequency and $\phi_1 \ldots \phi_n$ are the data.

The signals on lines 4 and 9 are heterodyned in mixer 10 to yield the following sum frequency signal:

$$y(t)=K_1\begin{cases}\cos\,[(\omega_s+a_1\omega_o)t+\phi_1] & \text{for}\quad 0\leq t<T_1\\ \cos\,[(\omega_s+a_2\omega_o)t+\phi_2] & T_1\leq t<T_2\\ \quad\cdot & \quad\cdot\\ \quad\cdot & \quad\cdot\\ \quad\cdot & \quad\cdot\\ \cos\,[(\omega_s+a_n\omega_o)t+\phi_n] & T_{n-1}\leq t<T_n\end{cases}$$

where $K_1$ is a constant.

The above-described sum frequency signal resulting from the heterodyning of the signals $s(t)$ and $l(t)$ is extracted and amplified in the filter driver 11, raised to transmission level in power amplifier 12 and radiated by antenna 13.

Figure 2:
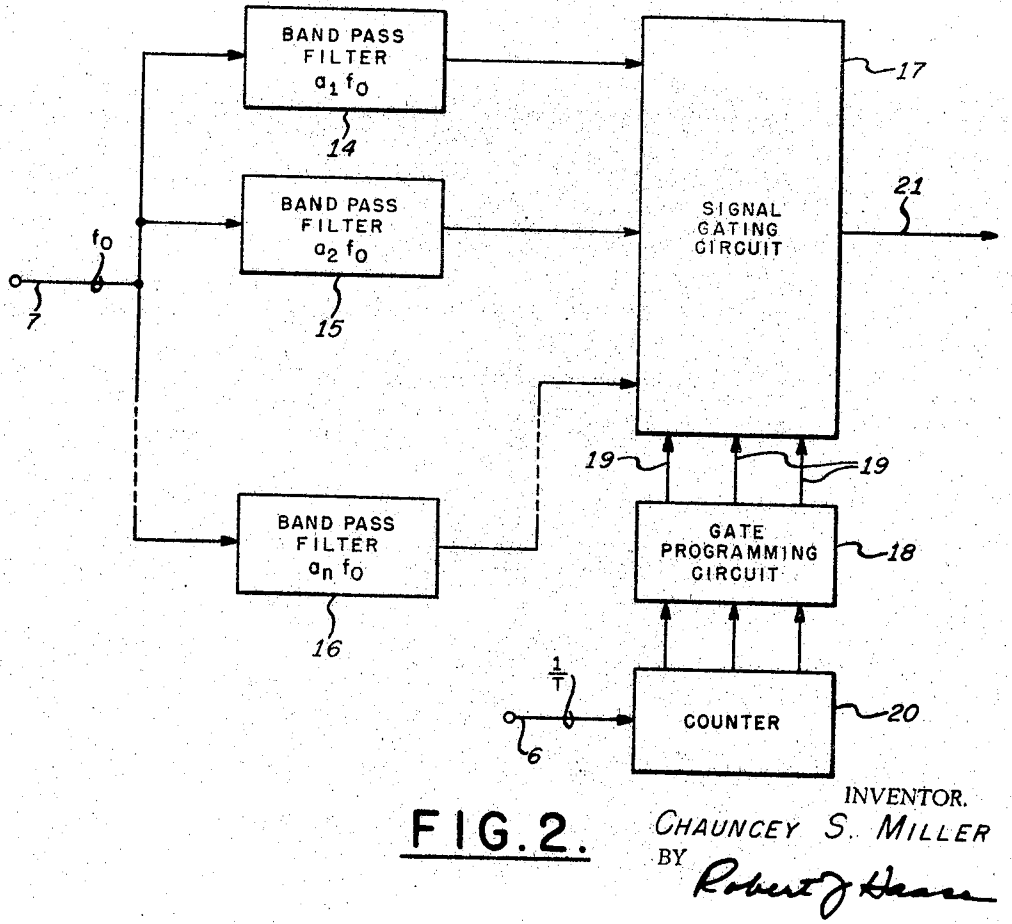
FIGURE 2 is a block diagram of the frequency step generator component of FIGURE 1.

A typical embodiment of frequency step generator 8 of FIGURE 1 is represented in FIGURE 2. The signal on line 7 designated $f_o$ is a series of short pulses with repetition rate $f_o$ which is applied to a bank of bandpass filters 14, 15 and 16, each filter being tuned to a different harmonic of the fundamental frequency $f_o$. Only three filters are shown for the sake of simplicity but it will be recognized that a larger number can be and normally would be used. The phase shift of each filter is adjusted (by the addition of a phase shift network, if necessary) so that the frequencies have the phase relationship indicated in the equation for $l(t)$. The outputs of filters 14, 15 and 16 are applied to signal gating circuit 17 which is designed in a conventional manner to select one of the outputs from filters 14, 15 and 16 at a given time in accordance with the output from gate programming circuit 18 on lines 19. Circuit 18, in turn, is connected to the respective stages of counter 20 which receives the signal on line 6 of FIGURE 1 designated $1/T$.

As is well understood, the conditions of the stages of counter 20 change in response to each successive pulse on line 6 until the capacity of the counter is reached whereupon the entire sequence of conditions repeats. Gate programming circuit 18 successively energizes each of the lines 19 in accordance with the successive conditions of the stages of counter 20. Each of the lines 19, when energized, selects a respective output from filters 14, 15 and 16 and couples the selected output to line 21. It can be seen, therefore, that a succession of different frequency signals appears on output line 21, the frequencies being determined by filters 14, 15 and 16 and the sequence of the successive frequencies being determined by counter 20 and circuits 17 and 18. Inasmuch as the frequencies are harmonically related and coherently derived from the same source, there are no random phase shifts associated with the succession of signals appearing on line 21.

Figure 3:
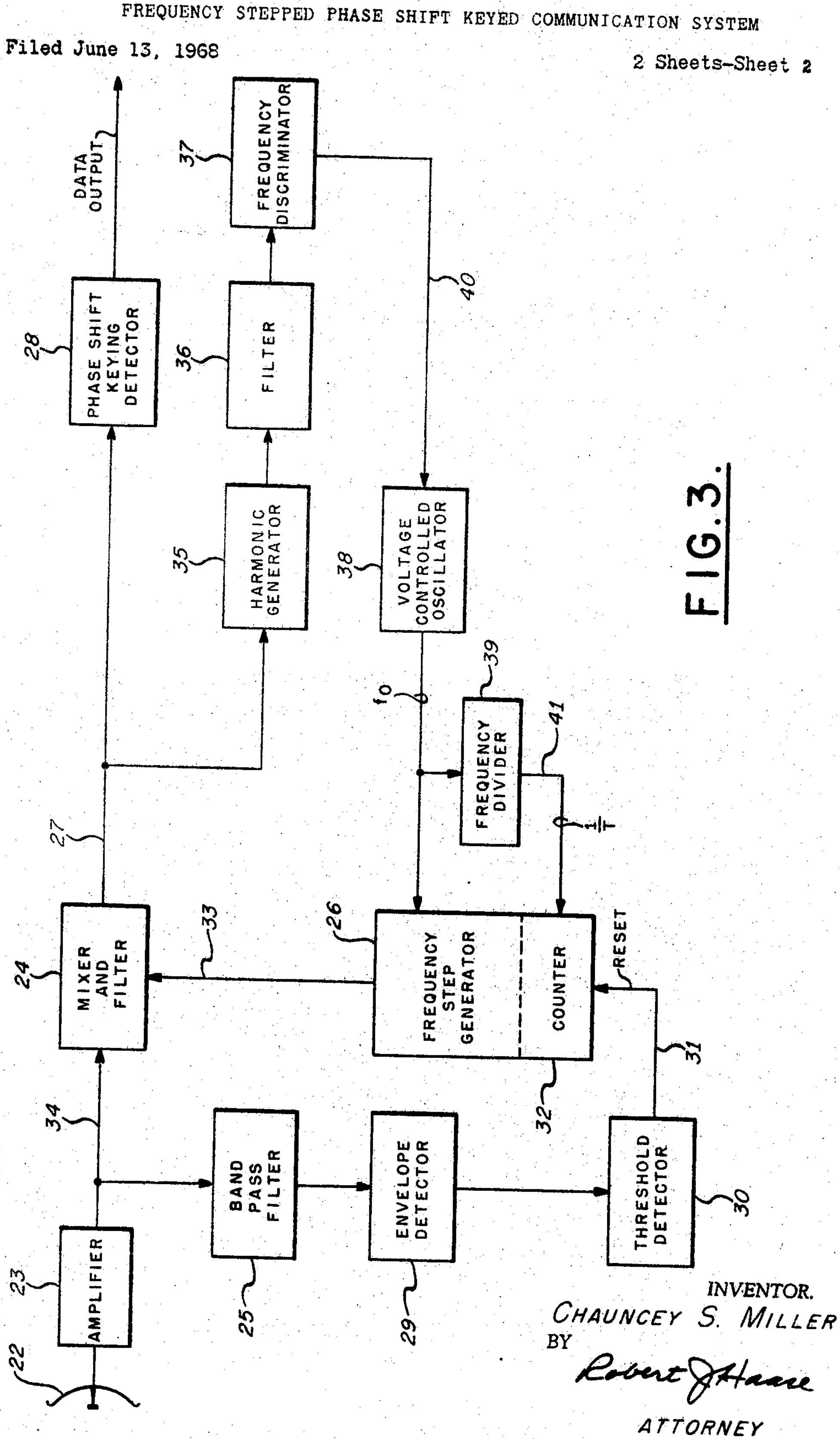
FIGURE 3 is a block diagram of the receiver portion of the present communication system.

Referring to FIGURE 3, the transmitted signal is received by antenna 22, amplified in amplifier 23 and jointly applied to mixer and filter 24 and to bandpass filter 25. Mixer and filter 24 also receives from frequency step generator 26 a signal identical to that on line 9 at the output of frequency step generator 8 of FIGURE 1. When the transmitted signal and the receiver local oscillator signal are heterodyned in mixer 24 and the resulting lower sideband or difference frequency is filtered out, the original phase shift keyed signal $s(t)$ is recovered and made available on line 27. The recovered signal is detected in a conventional manner in phase shift keying detector 28.

The remaining receiver apparatus is provided to properly synchronize frequency step generator 26 to the received signals and to compensate for Doppler frequency shifts to the received signals. Synchronization is achieved through the use of bandpass filter 25, envelope detector 29 and threshold detector 30. Band pass filter 25 is tuned to a predetermined one of the frequencies in the frequency stepping sequence. When the particular frequency is received to which filter 25 is tuned, an output is produced by filter 25 and is detected in envelope detector 29 as a pulse having a duration equal to the duration of the frequency step. When the amplitude of the detected pulse surpasses the threshold of detector 30, a pulse is provided on line 31 for resetting the counter 32 associated with frequency step generator 26. The resetting of counter 32 instantly causes generator 26 to produce the same frequency to which bandpass filter 25 is tuned. The state to which counter 32 is reset is adjusted to account for delay experienced by the signal in passing through the bandpass filter 25, envelope detector 29 and threshold detector 30. Inasmuch as the frequency stepping sequence of generator 26 is identical to the frequency stepping sequence of generator 8 of FIGURE 1, the locally generated signals $l(t)$ on line 33 are fully synchronized to the received signals $y(t)$ on line 34 as soon as counter 32 is reset by the arrival at the receiver of the frequency to which bandpass filter 25 is tuned.

Precise synchronization between the signals on lines 33 and 34 is not mandatory. If the correct local oscillator frequency on line 33 is switched at time $t=T_1+t_d$ instead of at time $t=T_1$, the resulting signal $r(t)$ with the synchronization error is:

$$r(t)=K_2\begin{cases}\cos\,[\{\omega_s+(a_1-a_n)\omega_o\}t+\phi_1] & 0\leq t<t_d\\ \cos\,[\omega_s t+\phi_1] & t_d\leq t<T_1\\ \cos\,[\{\omega_s+(a_2-a_1)\omega_o\}t+\phi_2] & T_1\leq t<T+t_d\\ \cos\,(\omega_s t+\phi_2) & T_1+t_d\leq t<T_2\\ \qquad\cdot & \\ \qquad\cdot & \\ \qquad\cdot & \end{cases}$$

where $K_2$ is a constant.

It can be seen from the resulting signal $r(t)$ that synchronization error causes only a temporary offset (for the duration $t_d$) but does not alter the phase relationship between the successive signals which represents the data being communicated.

Returning to FIGURE 3, Doppler frequency tracking of the received signal is achieved through the use of harmonic generator 35, filter 36, frequency discriminator 37, voltage controlled oscillator 38 and frequency divider 39. The phase shift keyed signal on line 27 is applied to generator 35 to provide a desired harmonic of the signal which is independent of the phase modulation. The desired harmonic at the output of generator 35 is extracted by filter 36 and applied to frequency discriminator 37. Discriminator 37 provides an error voltage on line 40 to control oscillator 38 to generate the correct output frequency to compensate for the Doppler frequency shift of the received signal. Frequency divider 39 receives the Doppler frequently compensated signal ($f_o$) and produces a Doppler frequency compensated signal ($1/T$) on line 41.

It can be seen from the preceding specification that the communication system of the present invention employs frequency stepping in a phase shift keyed communication system to combat self-interference. The system, by employing phase shift keying, requires less bandwidth than conventional multi-frequency systems and has the added advantage of avoiding disruption of the received data in the presence of minor synchronization errors in the receiver frequency step generator. Additionally, the receiver can be locked with the incoming data even in the presence of Doppler frequency shift of the received signal provided that the frequency difference between the desired signal passed by filter 25 and any other signal on line 34 is greater than the Doppler shift. Otherwise, it may become necessary to employ a more elaborate synchronization scheme such as, for example, where the entire locally generated frequency stepped signal is correlated with the entire received signal and the timing of the locally generated signal is adjusted for maximum correlation.

It should be observed that although the sum signal is transmitted and the difference signal is generated within the receiver of the disclosed embodiment, the converse situation is equally suitable. That is, the phase shift keyed carrier signal and the frequency stepped signal may be heterodyned and filtered to yield a difference frequency signal at the transmitter whereas the received signal and the locally generated frequency stepped signal may be heterodyned and filtered to yield a sum frequency signat at the receiver. The phase shift keyed carrier signal can be recovered in either case with substantially the same freedom from self-interference such as from multipath effects.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A communication system for transmitting information over multiple signal propagation paths comprising a transmitter and a receiver; said transmitter comprising:
means for producing a phase shift keyed carrier signal,
means for producing a succession of different frequency pulses having a desired frequency stepping sequence, said sequence repeating over an interval which exceeds the maximum signal propagation delay anticipated between said transmitter and receiver,
means for mixing said signal and said pulses to produce a first sideband signal differing in frequency from said carrier signal in one of two opposite senses, and
means for transmitting said first sideband signal, said receiver comprising:
means for receiving the transmitted first sideband signal,
means for producing a local signal having a frequency stepping sequence similar to said desired sequence, and
means for mixing the received signal and said local signal to produce a second sideband signal differing in frequency from said received signal in the other of said two senses.

2. A communication system as defined in claim 1 wherein said first sideband signal is a sum frequency signal and said second sideband signal is a difference frequency signal.

3. A communication system as defined in claim 1 wherein the frequency stepping sequence of said local signal is identical to said desired sequence.

4. A communication system as defined in claim 1 wherein said different frequency pulses are coherently frequency related to each other.

5. A communication system comprising a transmitter and a receiver; said transmitter comprising:
means for producing a phase shift keyed carrier signal,
means for producing a succession of different frequency pulses having a desired frequency stepping sequence, means for mixing said signal and said pulses to produce a first sideband signal differing in frequency from said carrier signal in one of two opposite senses, and
means for transmitting said first sideband signal, said receiver comprising:
means for receiving the transmitted first sideband signal,
means for producing a local signal having a frequency stepping sequence similar to said desired sequence, and
means for mixing the received signal and said local signal to produce a second sideband signal differing in frequency from said received signal in the other of said two senses,
said phase shift keyed signal having a carrier frequency integrally related to the duration of each of said pulses and the frequency separation between said pulses.

6. A communication system comprising a transmitter and a receiver; said transmitter comprising:
means for producing a phase shift keyed carrier signal,
means for producing a succession of different frequency pulses having a desired frequency stepping sequence,
means for mixing said signal and said pulses to produce a first sideband signal differing in frequency from said carrier signal in one of two opposite senses, and
means for transmitting said first sideband signal, said receiver comprising:
means for receiving the transmitted first sideband signal,
means for producing a local signal having a frequency stepping sequence similar to said desired sequence,
means for mixing the received signal and said local signal to produce a second sideband signal differing in frequency from said receiver signal in the other of said two senses, and
means for frequency adjusting said local signal in accordance with the frequency of said difference frequency signal.

References Cited

UNITED STATES PATENTS 3,384,822 5/1968 Miyaei ------------- 325—30

RODNEY D. BENNETT, Jr., Primary Examiner

CHARLES E. WANDS, Assistant Examiner

U.S. Cl. X.R.

325—163